United States Patent
Brown et al.

(10) Patent No.: US 7,300,016 B2
(45) Date of Patent: Nov. 27, 2007

(54) TAPE REEL ASSEMBLY WITH STIFF WINDING SURFACE FOR A TAPE DRIVE SYSTEM

(75) Inventors: Jerome D. Brown, Wahpeton, ND (US); Dean E. Sitz, Wahpeton, ND (US); Gregory H. Johnson, Oakdale, MN (US); Trevor J. Stav, Wahpeton, ND (US); James L. Albrecht, Wahpeton, ND (US); Carter J. Hansen, Wahpeton, ND (US); Geoffrey A. Lauinger, Campbell, MN (US); Michael E. Reard, Fergus Falls, MN (US); Christopher J. Zwettler, Lake Elmo, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/681,851

(22) Filed: Oct. 8, 2003

(65) Prior Publication Data

US 2005/0077409 A1    Apr. 14, 2005

(51) Int. Cl.
*B65H 75/08* (2006.01)
(52) U.S. Cl. ............... 242/613.4; 242/348; 242/610.5
(58) Field of Classification Search ........... 242/348, 242/348.2, 609, 610, 610.4, 610.5, 610.6, 242/611, 613, 613.4
See application file for complete search history.

(56) References Cited

U.S. PATENT DOCUMENTS

| RE26,556 | E | * | 3/1969 | Hultgren | ............ 242/610.4 |
|---|---|---|---|---|---|
| 3,485,456 | A | * | 12/1969 | Tellen et al. | ............ 242/610.4 |
| 3,485,457 | A | * | 12/1969 | Hultgren | ............ 242/613.4 |
| 4,102,514 | A | | 7/1978 | Ito | |
| 4,807,826 | A | * | 2/1989 | Iwahashi | ............ 242/613.4 |
| 5,564,647 | A | | 10/1996 | Bay et al. | |
| 5,699,973 | A | | 12/1997 | Nakane et al. | |
| 5,701,225 | A | | 12/1997 | Okumura et al. | |
| 6,040,966 | A | | 3/2000 | Erickson | |
| 6,318,659 | B1 | | 11/2001 | Zwettler et al. | |
| 6,478,244 | B2 | | 11/2002 | Zwettler et al. | |
| 6,719,238 | B1 | | 4/2004 | Grant et al. | |
| 2002/0084379 | A1 | | 7/2002 | Morita | |
| 2003/0226924 | A1 | * | 12/2003 | Morita | ............ 242/348 |
| 2003/0226931 | A1 | * | 12/2003 | Morita | ............ 242/610.4 |

* cited by examiner

*Primary Examiner*—William A. Rivera
(74) *Attorney, Agent, or Firm*—Eric D. Levinson

(57) ABSTRACT

A tape reel assembly for a tape drive system component, such as a data storage tape cartridge, is described that includes a hub. The hub defines an inner surface and a tape winding surface, and at least a portion of the hub is made of plastic. The tape winding surface has an effective radial modulus of greater than 0.3 million pounds-per-square-inch.

19 Claims, 10 Drawing Sheets

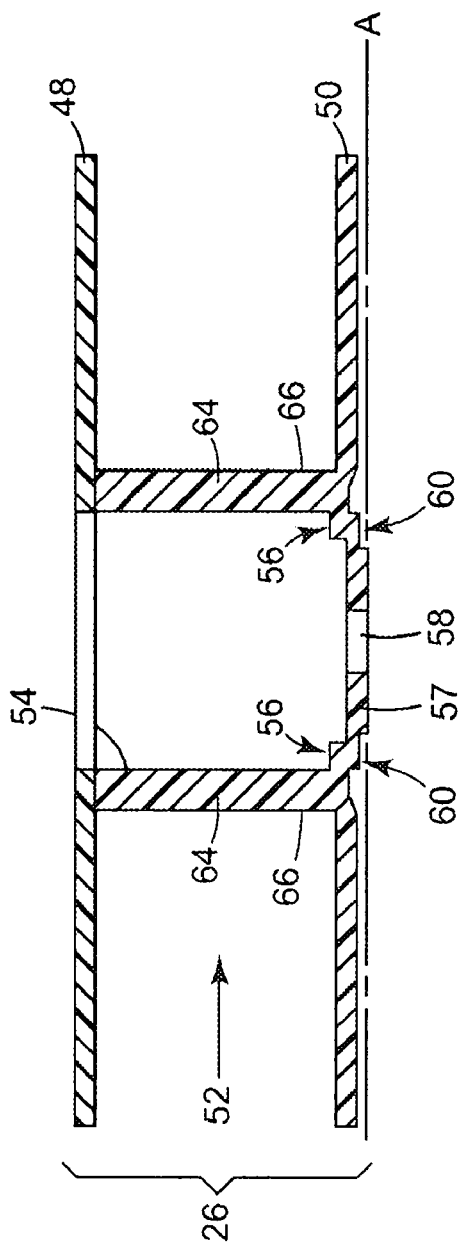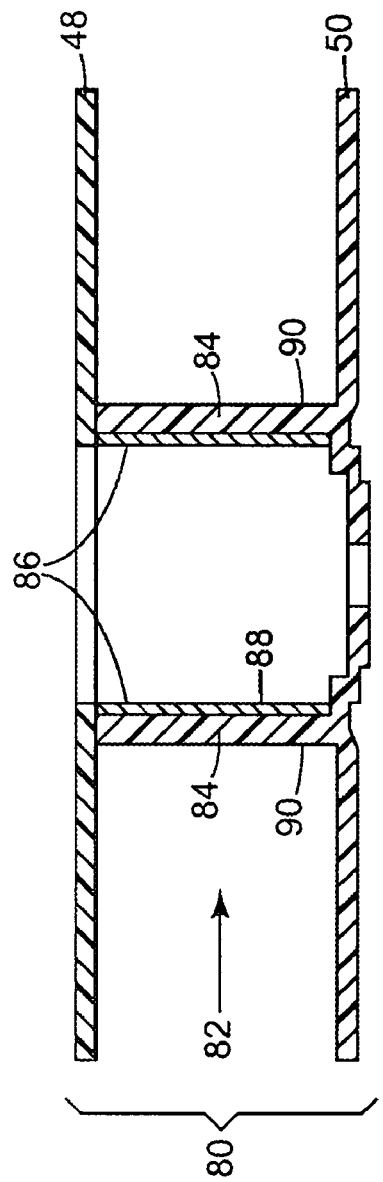

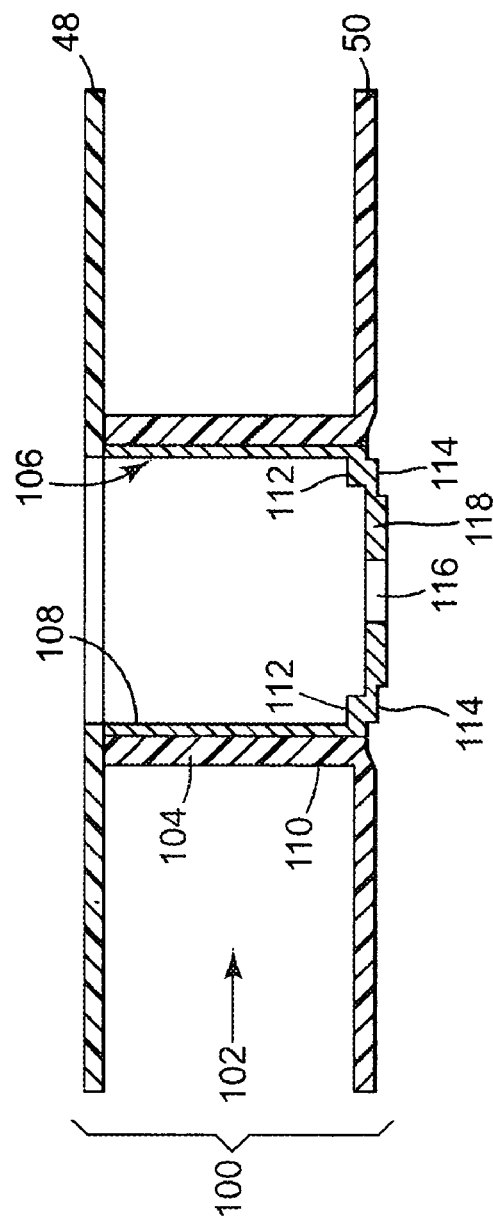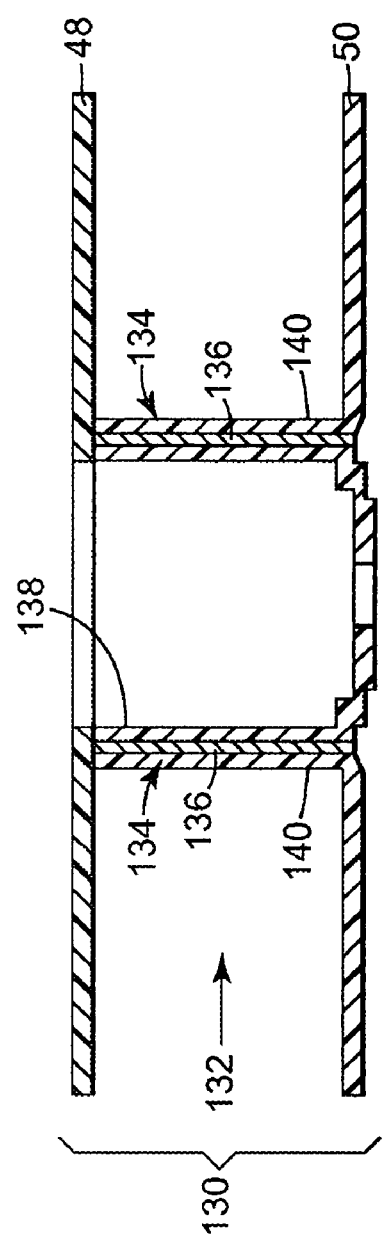

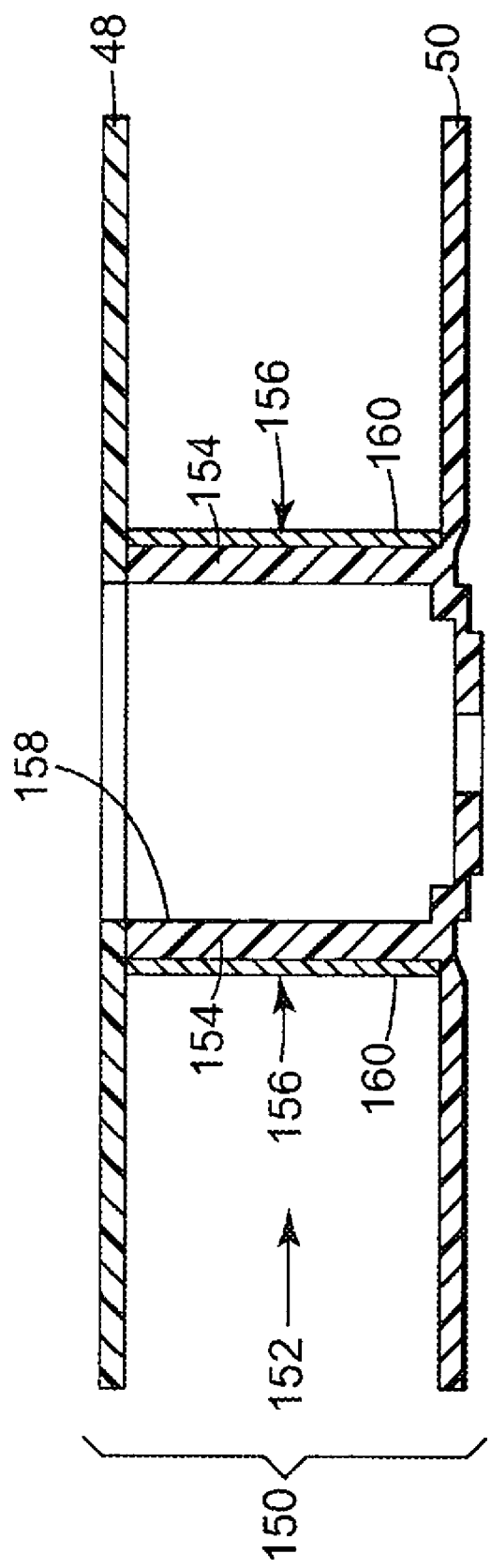

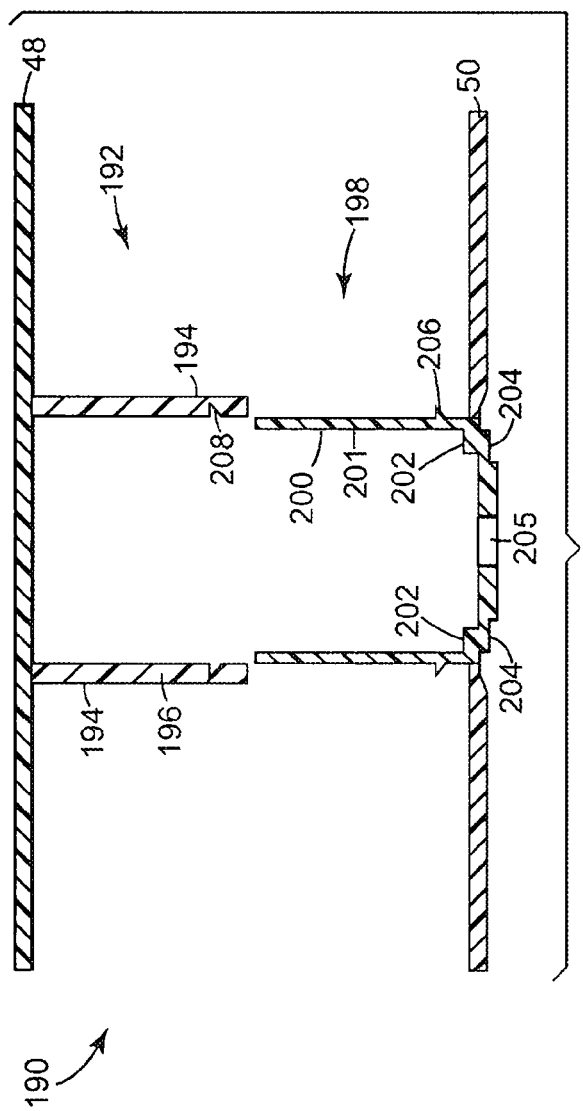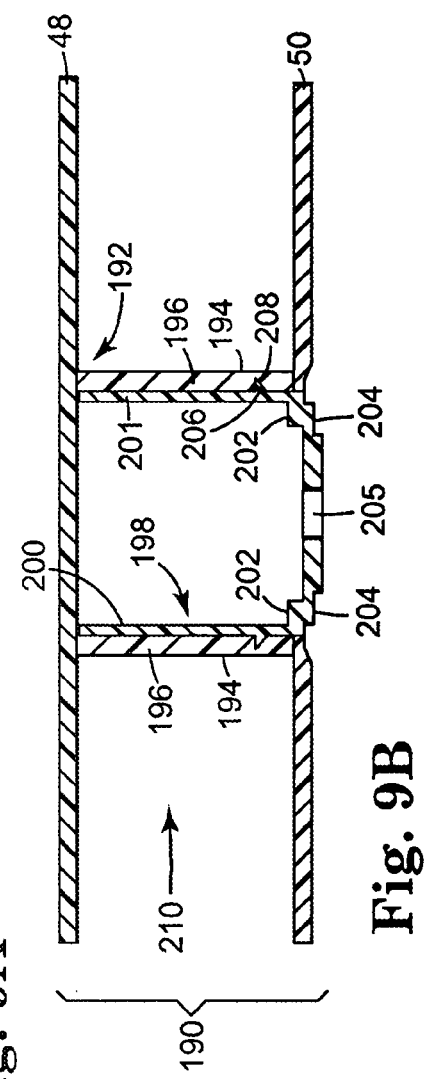

TAPE REEL ASSEMBLY WITH STIFF WINDING SURFACE FOR A TAPE DRIVE SYSTEM

THE FIELD OF THE INVENTION

The present invention relates to a tape reel assembly for a tape drive system component, such as data storage tape cartridge or a tape drive. More particularly, it relates to a tape reel assembly having a deformation resistant tape winding surface.

BACKGROUND OF THE INVENTION

Data storage tape cartridges have been used for decades in the computer, audio and video fields. The data storage tape cartridge continues to be an extremely popular device for recording large volumes of information for subsequent retrieval and use.

A data storage tape cartridge generally consists of an outer shell or housing maintaining at least one tape reel assembly and a length of magnetic storage tape. The storage tape is wrapped about a hub portion of the tape reel assembly and is driven through a defined tape path by a driving system. The housing normally includes a separate cover and a separate base. Together, the cover and base form an opening (or window) at a forward portion thereof permitting access to the storage tape by a read/write head upon insertion of the data storage tape cartridge into the tape drive. This interaction between storage tape and head may take place within the housing (for example, with a mid-tape load design), or the storage tape may be directed away from the housing to an adjacent area where the read/write head is located (for example, with a helical drive design or a leader block design). Where the tape cartridge/drive system is designed to direct the storage tape away from the housing, the data storage tape cartridge normally includes a single tape reel assembly. Alternately, where the tape cartridge/drive system is designed to provide head/storage tape interaction proximate the housing, a two (or dual) tape reel configuration is typically employed.

Regardless of the number of tape reel assemblies associated with a particular data storage tape cartridge, the tape reel assembly itself is generally comprised of three basic components: an upper flange, a lower flange, and a hub. The hub forms a tape winding surface about which the storage tape is wound. The flanges are disposed at opposite ends of the hub, and are spaced apart to accommodate a width of the storage tape. To reduce the likelihood of the storage tape undesirably contacting one of the flanges during a winding operation, the flange-to-flange spacing is selected to be slightly greater than the width of the tape. However, even when the flanges are so spaced, successive layers of wrapped storage tape can eventually cause the tape winding surface to deform radially inwardly, in turn drawing the flanges toward one another. Thus, deformation of the tape winding surface can lead to contact between the storage tape and the flanges. As a point of reference, contact between either flange and an edge of the storage tape will transfer a high frequency lateral movement of the storage tape back to the read/write head, possibly leading to servo-tracking errors. Notably, other tape reel assemblies eliminate the flanges, such that only a hub is provided.

Tape reel assemblies are typically formed from plastic components. Though cost effective, plastic hubs and flanges can deform under compressive forces associated with successive windings of storage tape. Consumers generally prefer storing as much information as possible in one data storage tape cartridge. This consumer preference translates to wrapping more and more storage tape on the tape reel assembly/assemblies. In the case of a single reel data storage tape cartridge, all of the storage tape is by necessity wound about only one reel. The large number of tape windings directly correlates to a large tape winding force. Accordingly, tape reel assemblies, and especially single reel data storage tape cartridges, are vulnerable to deformation of the tape winding surface that can contribute to servo-tracking errors.

Previously, the lateral storage tape displacement identified above was of minimal concern as the servo-track associated with the storage tape was sufficiently sized to account for expected lateral displacement. In general terms, the servo-track provides a baseline by which the read/write head can ascertain a "position" of the storage tape. The servo-track width has previously been sufficient to accommodate the lateral movement associated with a typical number of storage tape windings about the hub. However, evolution of tape cartridge/tape drive technology has resulted in increased storage of data characterized by smaller track widths, including the servo-track width. The reduced-width servo-track has a limited frequency (or lateral displacement) response. Therefore, the above-described winding surface deformation can lead to contact between the flanges and the storage tape creating a lateral displacement well above the bandwidth of the now smaller sized servo-track. This, in turn, contributes to servo-tracking errors. Similar concerns can arise relative to tape reel assemblies maintained within the tape drive itself (such as with a tape drive adapted to operate a single reel cartridge). Tape reel assemblies used within tape drives are commonly referred to as tape drive spools or take-up reels.

Data storage tape cartridges are useful tools suitable for storing vast amounts of information. With increasing speeds of reading/writing and advanced magnetic tape technology, design of the data storage tape cartridge is directed to providing accurate and consistent storage tape positioning. To this end, any deformation of the hub, and particularly to the winding surface, can result in deflection of the tape position creating errors in reading from, and writing to, the storage tape. Therefore, a need exists for a tape reel assembly configured to resist deformation of the hub at the tape winding surface.

SUMMARY OF THE INVENTION

One aspect of the present invention relates to a tape reel assembly for a tape drive system for winding and unwinding storage tape, the tape reel assembly including a hub. The hub defines an inner surface and a tape winding surface, and at least a portion of the hub is made of plastic. In this regard, the tape winding surface has an effective radial modulus of greater than 0.3 million pounds-per-square-inch.

Another aspect of the present invention relates to a tape reel assembly for a tape drive system including a hub. The hub defines an inner surface and a tape winding surface, and at least a portion of the hub is made of plastic. In this regard, at least a portion of the tape winding surface is metal.

Yet another aspect of the present invention relates to a tape reel assembly for a tape drive system including a hub. The hub defines an inner surface and a tape winding surface, and at least a portion of the hub is made of plastic. In this regard, the hub is comprised of 30% glass-filled styrene acrylonitrile.

Yet another aspect of the present invention relates to a tape reel assembly for a tape drive system including a hub. The hub includes a core and a backbone that combine to define an inner surface and a tape winding surface, and at least a portion of the hub is made of plastic. In this regard, at least a portion of the inner surface is metal.

Yet another aspect of the present invention relates to a tape reel assembly for a tape drive system including a hub. The hub defines an inner surface and a tape winding surface, a plastic core disposed between the inner surface and the tape winding surface, and a metal annulus disposed within the core.

Yet another aspect of the present invention relates to a tape reel assembly for a tape drive system including a hub. The hub defines an inner surface and a tape winding surface, and at least a portion of the hub is made of plastic. This aspect of the present invention includes means for configuring the tape winding surface to have an effective radial modulus of greater than 0.3 million pounds-per-square-inch.

A further aspect of the present invention relates to a data storage tape cartridge comprising a housing defining an enclosed region and at least one tape reel assembly rotatably disposed within the enclosed region. The tape reel assembly includes a hub. The hub defines an inner surface and a tape winding surface. A storage tape is wound about the tape winding surface of the hub and applies a stress that deflects the tape winding surface. The deflection of the tape winding surface resulting from the applied stress corresponds to an effective radial modulus of the tape winding surface of greater than 0.3 million pounds-per-square-inch.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

FIG. 3 is a cross-sectional view of the tape reel assembly of FIG. 2;

FIG. 4 is a cross-sectional view of a tape reel assembly illustrating a hub having a core including a metal insert at an inner surface according to one embodiment of the present invention;

FIG. 5 is a cross-sectional view of a tape reel assembly illustrating a hub having a core including a cup-shaped metal backbone at an inner surface;

FIG. 6 is a cross-sectional view of a tape reel assembly illustrating a hub having a core including a metal insert disposed within the core according to one embodiment of the present invention;

FIG. 7 is a cross-sectional view of a tape reel assembly illustrating a hub having a core including a metal insert at a tape winding surface in accordance with the present invention;

FIG. 9A is a cross-sectional view of a tape reel assembly including a two-piece hub according to one embodiment of the present invention;

FIG. 9B is a cross-sectional view of the tape reel assembly of FIG. 9A in an assembled state;

DETAILED DESCRIPTION OF THE PREFERRED EMBODIMENTS

Figure 1:
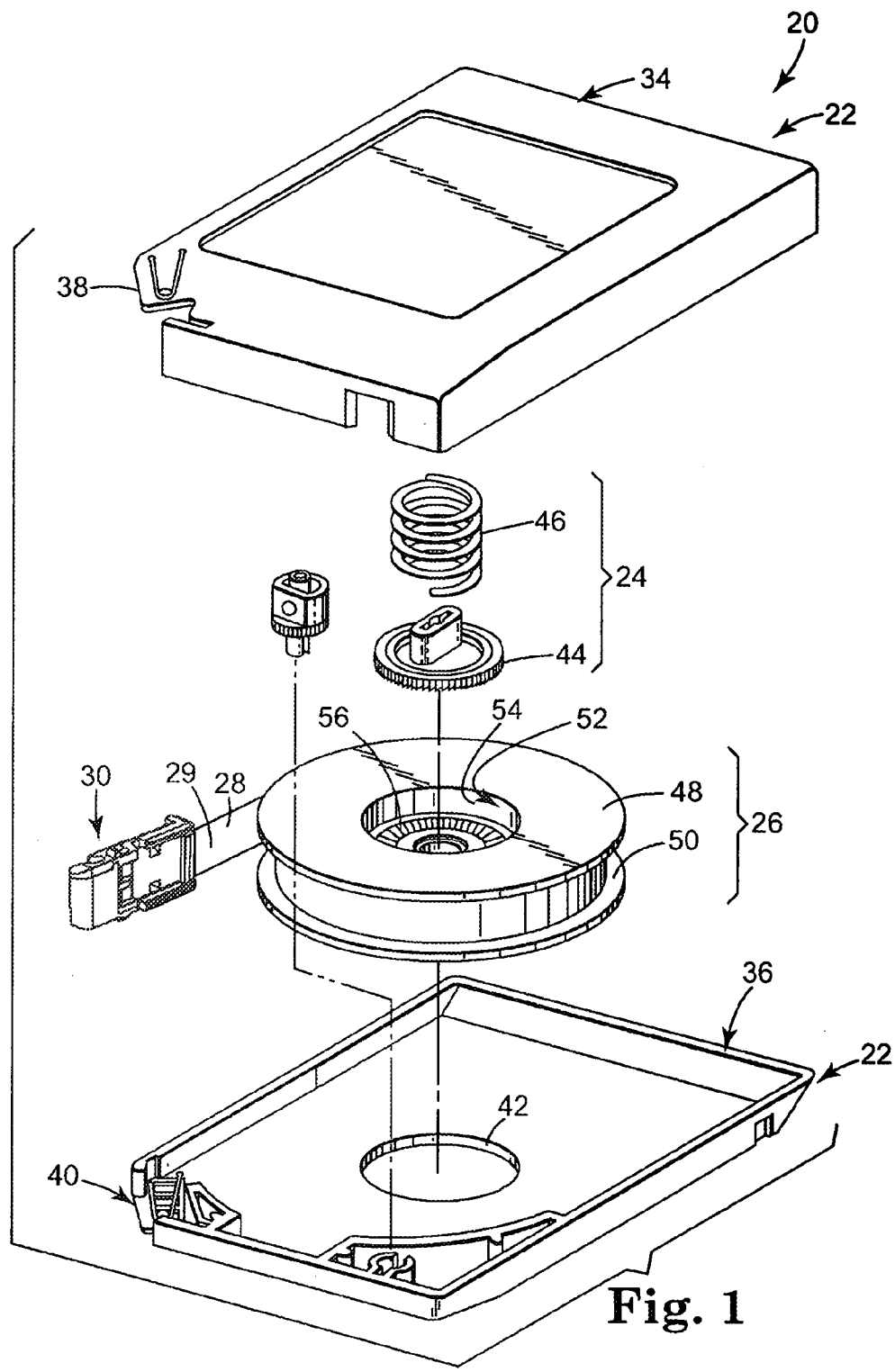
FIG. 1 is a perspective, exploded view of a single reel data storage tape cartridge showing a tape reel assembly.

The present invention relates to a tape reel assembly useful as part of a tape drive system component, such as a data storage tape cartridge or a tape drive. To this end, an exemplary single reel data storage tape cartridge according to one embodiment of the present invention is illustrated at 20 in FIG. 1. Generally, the single reel data storage tape cartridge 20 includes a housing 22, a brake assembly 24, a single tape reel assembly 26, a storage tape 28, and a leader block 30. The single tape reel assembly 26 is disposed within the housing 22. The storage tape 28, in turn, is wound about the single tape reel assembly 26 and includes a leading end 29 attached to the leader block 30. As a point of reference, while a single reel data storage tape cartridge 20 is shown, the present invention is equally applicable to other cartridge configurations, such as a dual reel cartridge. Further, the tape reel assembly 26 of the present invention can be employed as a component apart from a data storage tape cartridge, for example, as part of a tape drive (not shown).

The housing 22 is sized to be received by a typical tape drive (not shown). Thus, the housing 22 exhibits a size of approximately 125 mm×10 mm×21 mm, although other dimensions are equally acceptable. With this in mind, the housing 22 is defined by a first housing section 34 and a second housing section 36. In one embodiment, the first housing section 34 forms a cover whereas the second housing section 36 forms a base. As used throughout the specification, directional terminology such as "cover," "base," "upper," "lower," "top," "bottom," etc., is employed for purposes of illustration only and is in no way limiting.

The first and second housing sections 34 and 36, respectively, are sized to be reciprocally mated to one another and are generally rectangular, except for one corner 38 that is preferably angled and forms a tape access window 40. The tape access window 40 serves as an opening for the storage tape 28 to exit from the housing 22 such that the storage tape 28 can be threaded to a tape drive (not shown) when the leader block 30 is removed from the tape access window 40. Conversely, when the leader block 30 is engaged in the tape access window 40, the tape access window 40 is covered.

In addition to forming a portion of the tape access window 40, the second housing section 36 also forms a central opening 42. The central opening 42 facilitates access to the single tape reel assembly 26 by a drive chuck portion of the tape drive (not shown).

Figure 2:
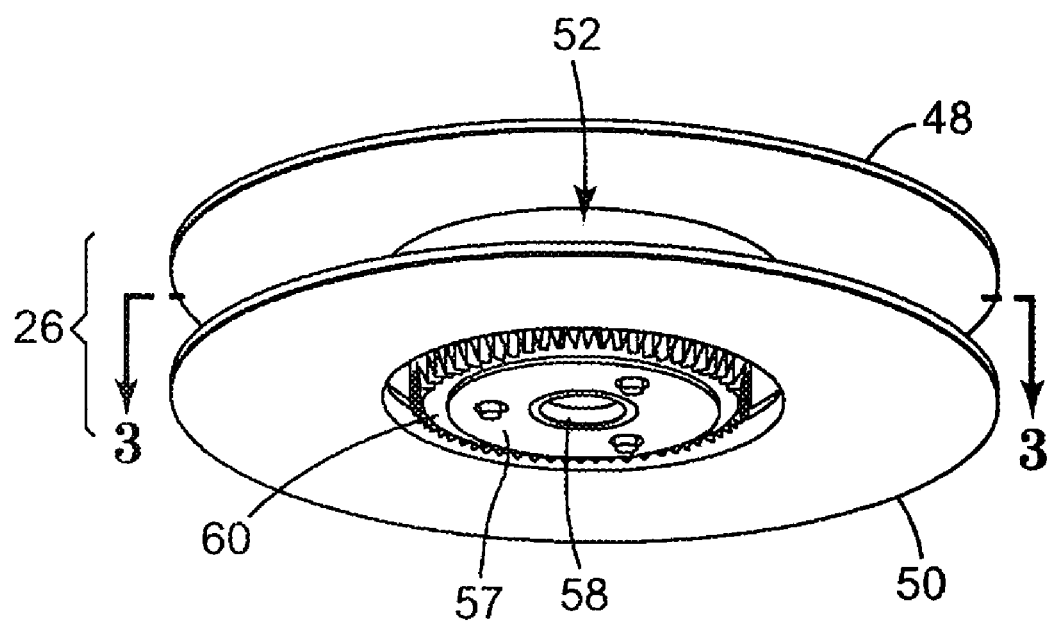
FIG. 2 is a perspective view of the tape reel assembly of FIG. 1.

With reference to FIG. 2, the single tape reel assembly 26 includes an upper flange 48, a lower flange 50, and a hub 52. The hub 52 defines an inner surface 54 that is sized to co-axially receive the brake assembly 24. The brake assembly 24 is of a type known in the art and generally includes a brake 44 and a spring 46 (FIG. 1). When engaged, the brake assembly 24 meshes with a brake interface 56 formed within a plane of the lower flange 50 to selectively "lock" the single tape reel assembly 26 to the housing 22. As illustrated in FIG. 1, the brake interface 56 is generally perpendicular to, and adjacent to, inner surface 54. In one embodiment, the brake interface 56 is a gear having teeth. Alternatively, other brake configurations are equally acceptable. Regardless, the storage tape 28 is wound about the hub 52, constrained laterally by the flanges 48, 50.

The storage tape 28 is preferably a magnetic tape of a type commonly known in the art. For example, the storage tape 28 may consist of a balanced polyethylene naphthalate (PEN) based material coated on one side with a layer of magnetic material dispersed within a suitable binder system and coated on the other side with a conductive material dispersed within a suitable binder system. Acceptable magnetic tape is available, for example, from Imation Corp., Oakdale, Minn.

The leader block 30 covers the tape access window 40 and facilitates retrieval of the storage tape 28. In general terms, the leader block 30 is shaped to conform to the window 40 of the housing 22 and to cooperate with the tape drive (not shown) by providing a grasping surface for the tape drive to manipulate in delivering the storage tape 28 to the read/write head. In this regard, the leader block 30 can be replaced by other components, such as a dumb-bell shaped pin. Moreover, the leader block 30, or a similar component, can be eliminated entirely, such as with a dual reel cartridge design.

The present invention as more fully described below is beneficially employed with either a single tape reel assembly or a multiple tape reel assembly cartridge design, and is not limited to single tape reel cartridge assemblies. With this in mind, the tape reel assembly 26 of FIG. 2 includes the upper flange 48 and the lower flange 50; the flanges 48, 50 extend in a radial fashion from opposing sides of the hub 52, respectively. A drive washer 57 defines a drive bore 58 that is centrally positioned with respect to the lower flange 50. The drive washer 57 can be eliminated in alternative tape reel assembly configurations. A drive interface 60 is configured to engage with the tape drive (not shown) in manipulating the tape reel assembly 26 during read/write processes. In one embodiment, the drive interface 60 is a gear having teeth.

With reference to FIG. 3, the hub 52 includes the inner surface 54, a core 64, and a tape winding surface 66. The brake interface 56 is an interior surface of the tape reel assembly 26 that is adjacent the inner surface 54. The drive interface 60 is an exterior surface of the tape reel assembly 26 that is adjacent to the lower flange 50. In this regard, the drive washer 57 defines the drive bore 58, such that the drive washer 57 and the drive bore 58 are located in a plane exterior to the hub 52. In particular, FIG. 3 illustrates that plane A is parallel to the drive washer 57 and locates drive washer 57 (and drive bore 58) outside a region of the hub 52 (i.e., the drive washer 57 and the drive bore 58 are essentially planar with the lower flange 50, and, therefore, are exterior to the hub 52 and the tape winding surface 66). For example, in one embodiment, the drive bore 58 is essentially planar with the lower flange 50 and separated from the inner surface 54 of the hub 52 by a distance of approximately 0.5 inch. During use, winding of the storage tape 28 (FIG. 1) onto the hub 52 places a compressive winding stress (due to an increase in radial pressure from each successive tape wrap) upon the tape winding surface 66. Prior tape reel assemblies inadequately accounted for the compressive winding stress that deforms the tape winding surface 66. That is to say, prior art tape reel assemblies can have deformed tape winding surfaces that exhibit non-uniform winding of the storage tape 28 and deflection of the upper flange 48 and/or the lower flange 50 toward the other sufficiently to cause tape-to-flange contact.

By way of further explanation, the deformation of the tape winding surface 66 due to the compressive winding stress of the storage tape 28 could be non-symmetrical with respect to the upper flange 48 and the lower flange 50 such that one of the flanges 48, 50 would exhibit more deflection than the opposite flange. Alternately, the deformation of the tape winding surface 66 could be symmetric such that the upper flange 48 and the lower flange 50 deflect the same amount. In any regard, every material has associated with it a "material modulus" that represents the material's deformation (i.e., response) to an applied stress. For example, the material modulus for any material is defined as the ratio between the applied stress and the change in dimension (i.e., the deformation) of the material in the direction of the applied stress. In material science terms, the change in size of the material is defined as a dimensionless value known as strain. Consonant with this example, strain is a ratio of the change in the radial dimension of the hub 52 compared to the initial radial dimension of the hub 52. The dimensions of strain are length divided by length, and, as such, strain has the units of, for example, inch per inch (which is to say, strain is dimensionless). Therefore, for materials in general, the slope of the stress-strain curve (typically at zero strain) defines the material modulus. In this way, a material's stiffness can be evaluated and compared by reference to its material modulus. By convention, the material modulus has dimensions of force per area and units of, for example, pounds per square inch (or million pounds-per-square-inch, i.e., Msi, or thousand pounds per square inch, i.e, ksi). For a given applied stress, a material with a high material modulus will exhibit less deformation (strain) than a material with a low material modulus. That is to say, a material with a higher material modulus is stiffer than a material with a lower material modulus.

Additionally, and with reference to tape reel assemblies in general, an effective radial modulus is defined to represent the radial deformation exhibited by the tape winding surface, for example, the tape winding surface 66 (FIG. 3) in response to successive wraps of storage tape, for example, the storage tape 28 (FIG. 1). The effective radial modulus is a function of the material modulus and the geometry of the tape reel assembly 26, in general. As used herein, the effective radial modulus characterizes the relative resistance to radial deformation of the tape winding surface 66 due to successive wraps of storage tape 28.

As a point of reference, one known hub construction is 20% glass-filled polycarbonate having a material modulus of 0.780 million pounds-per-square-inch (hereinafter Msi) and an effective radial modulus 0.190 Msi (available, for example, from Imation Corp., St. Paul, Minn., in tape cartridges under the brand identifier 9940). With the above discussion in mind, it has been discovered and described herein that the hub 52 of the present invention can be configured such that the tape winding surface 66 exhibits an effective radial modulus of greater than 0.3 Msi, more preferably the effective radial modulus is greater than 0.4 Msi, and, most preferably, the effective radial modulus is greater than 0.5 Msi. For example, and as described in detail below, it has been discovered that the hub 52 can be configured to have an effective radial modulus at the tape winding surface 66 of greater than 0.3 Msi such that the tape winding surface 66 exhibits reduced deformation due to successive windings of storage tape 28 (FIG. 1). According to the present invention, an increase in effective radial modulus results in stiffer tape winding surfaces 66 that resist deformation due to successive wraps of storage tape 28. That is to say, by the teachings of the several embodiments of the invention described herein, for a large applied stress, the resulting deformation at the tape winding surface 66 is significantly reduced because the tape winding surface 66 has an effective radial modulus of greater than 0.3 Msi.

In the embodiments of the invention described below, deformation to the tape winding surface 66 is minimized and approximately symmetrical with reference to the flanges 48, 50. Symmetrical and minimized deformation of the tape winding surface 66 allows the storage tape 28 (FIG. 1) to have a uniform tension gradient between its top edge and bottom edge such that winding uniformity is increased.

In one exemplary embodiment, a tape reel assembly 80 providing a tape winding surface with an effective radial modulus of greater than 0.3 Msi is illustrated in FIG. 4. The tape reel assembly 80 includes the upper flange 48, the lower flange 50, and a hub 82. The hub 82 includes a core 84 and a metal insert 86 that combine to define an inner surface 88 and a tape winding surface 90. Accordingly, the metal insert 86 is located opposite the tape winding surface 90 and is separated therefrom by a distance equal to a thickness of the core 84. In one embodiment, the core 84 has a thickness in a range of approximately 0.070 to 0.120 inch, and the metal insert 86 has a thickness of approximately 0.050 inch. In one preferred embodiment, the metal insert 86 is located about 0.120 inch from the tape winding surface 88. In a preferred embodiment, the metal insert 86 has a material modulus of greater than 29 Msi and is insert molded into a 20% glass-filled polycarbonate core 84 such that the tape winding surface 90, while itself formed of 20% glass-filled polycarbonate having an effective radial modulus of approximately 0.19 Msi, exhibits an effective radial modulus of greater than 1.0 Msi. In one embodiment, the metal insert 86 is an annular ring of steel insert molded into a one-piece tape reel assembly 80. In another embodiment, the core 84 and the metal insert 86 are configured such that the metal insert 86 forms at least a portion of the inner surface 88. In yet another embodiment, the metal insert 86 is a drawn steel annulus having a material modulus of approximately 30 Msi overmolded with, for example, plastic having a material modulus of approximately 0.4 Msi to form the hub 82 such that the tape winding surface 90 has an effective radial modulus of approximately 0.9 Msi. Of course, a variety of other materials exhibiting different material modulii can be employed. Therefore, the above embodiments of the present invention result in the tape winding surface 90 exhibiting increased stiffness and configured to have an effective radial modulus of greater than 300 ksi (or 0.3 Msi).

An alternate embodiment of a tape reel assembly 100 is illustrated in FIG. 5 and includes a hub 102 and the opposing flanges 48, 50. The hub 102 includes a core 104 and a metal backbone 106 that combine to define an inner surface 108 and a tape winding surface 110. In one embodiment, the metal backbone 106 is a cup-shaped annulus insert molded into the core 104 and forms the inner surface 108. In another embodiment, the metal backbone 106 is a cup-shaped annulus that forms a brake interface 112, a drive interface 114, and defines a drive bore 116. In a preferred embodiment, the backbone 106 is a cup-shaped annulus formed from drawn steel and includes a drive washer 118 defining the drive bore 116 where the drive washer 118 and the drive bore 116 are located in a plane exterior the core 104. In this regard, the drive bore 116 is separated from the inner surface 108 by a distance of approximately 0.5 inch, although other dimensions are equally acceptable. Additionally, the drive washer 118, when formed of steel, is configured to magnetically interface with a drive chuck magnet (not shown). Accordingly, the inner surface 108 is, via the metal backbone 106, formed of metal and the insert molding process deposits molded material (for example plastic) at the tape winding surface 110. In a manner consistent with at least one embodiment of the present invention, the tape winding surface 110 exhibits an effective radial modulus of greater than 0.3 Msi and resists deformation during winding of storage tape 28 (FIG. 1) onto the hub 102. In one preferred embodiment, the metal backbone 106 is formed of drawn steel having a material modulus of approximately 30 Msi such that the tape winding surface 110 has an effective radial modulus in excess of 0.9 Msi.

As illustrated in FIG. 5, the metal backbone 106 is positioned to exhibit a "self-centering" feature wherein the resulting molded hub 102 is highly uniform and symmetrical about the drive bore 116. In this manner, the drive bore 116 is provided with a superior radial run out such that the uniformity in mass, and hence the rotational balance of the hub 102, is increased. In one embodiment, the metal backbone 106 is insert molded contemporaneously with the core 104. In an alternate embodiment, the metal backbone 106 is provided with a plurality of through-holes (not shown) configured to be compatible with a "spider-plate" as employed when utilizing the Ultrium brand data storage tape cartridge available from Imation Corp., Oakdale, Minn. Additionally, the metal backbone 106 can be provided with a plurality of protrusions (not shown) adjacent to the brake interface 112, such that the protrusions are compatible with the brake 44 (FIG. 1).

In at least one embodiment, the hub 102 is manufactured separately from the opposing flanges 48, 50 which are subsequently attached to the hub 102. Alternately, the hub 102 and the opposing flanges 48, 50 can be integrally formed into one unit. Regardless, the hub 102 is positioned between the opposing flanges 48, 50 with the flanges 48, 50 being spaced in accordance with the width of the storage tape 28 (FIG. 1). The hubs of the present invention are beneficially employed with storage tape 28 having a width of greater than 0.25 inch. For example, in one embodiment the hub 102 includes the core 104 and the metal insert 106 having a material modulus of approximately 30 Msi (as illustrated in FIG. 5) and is sized to accept storage tape having a width of 0.75 inch. Notably, where the cartridge 20 (FIG. 1) is a belt driven design, the opposing flanges 48, 50 are not necessary to maintain the storage tape 28, and can, therefore, be eliminated. In the broadest sense then, the tape reel assembly 100 can consist of the hub 102 alone.

FIG. 6 illustrates another tape reel assembly 130 including a hub 132 and the opposing flanges 48, 50. The hub 132 includes a core 134 and a metal insert 136 disposed within the core 134 where the hub 132 defines an inner surface 138 and the tape winding surface 140. In particular, the core 134 is formed from a polymer and includes the metal insert 136 disposed therein. In this regard, the metal insert 136 is molded within the core 134 such that the inner surface 138 and the tape winding surface 140 comprise the polymer. Accordingly, the metal insert 136 is positioned between the inner surface 138 and the tape winding surface 140. In a preferred embodiment, the core 134 is formed from 20% glass-filled polycarbonate, whereas the metal insert 136 is aluminum. In this regard, both the inner surface 138 and the tape winding surface 140 comprise the 20% glass-filled polycarbonate. Note that the 20% glass-filled polycarbonate hub by itself has an effective radial modulus of approximately 0.190 Msi, yet consistent with this invention, the tape winding surface 140 exhibits an effective radial modulus of greater than 0.3 Msi. In one embodiment, the metal insert 136 is aluminum having a modulus of approximately 10 Msi such that the tape winding surface 140 has an effective radial modulus in excess of 0.9 Msi.

Upon reading and appreciating this disclosure, it will be recognized that tape winding surfaces having an effective radial modulus of greater than 0.3 Msi are stiff and contribute to uniform winding of storage tape characterized by reduced reading/writing errors. In furtherance of this teaching, another embodiment of a tape reel assembly 150 having a tape winding surface with an effective radial modulus of greater than 0.3 Msi is presented in FIG. 7. The tape reel assembly 150 includes a hub 152 and the opposing flanges 48, 50. The hub 152 includes a core 154 and a metal insert 156 that combine to define an inner surface 158 and a tape winding surface 160. As illustrated in FIG. 7, the metal insert 156 forms the tape winding surface 160. In one preferred embodiment, the metal insert 156 is an annular sleeve of aluminum 0.050 inch thick insert molded onto the core 154 such that the tape winding surface 160 has an effective radial modulus of approximately 0.9 Msi.

As illustrated in FIG. 7, the hub 152 is depicted as a unitary molded assembly. The metal insert 156 is shown as an annulus of metal, preferably aluminum. In one embodiment, the metal insert 156 is a continuous annulus of aluminum with a width approximately equal to the width of the storage tape 28 (FIG. 1), insert molded onto the core 154. In another embodiment, the metal insert 156 includes a metal band having a width substantially less than the width of the storage tape 28, and is insert molded in a position between the flanges 48, 50. Accordingly, the tape winding surface 160 has been described as including at least a portion of the metal insert 156, where the metal insert 156 has a thickness between 0.005 and 0.250 inch, more preferably between 0.010 and 0.100 inch, even more preferably between 0.025 and 0.075 inch, and most preferably 0.050 inch.

Figure 8:
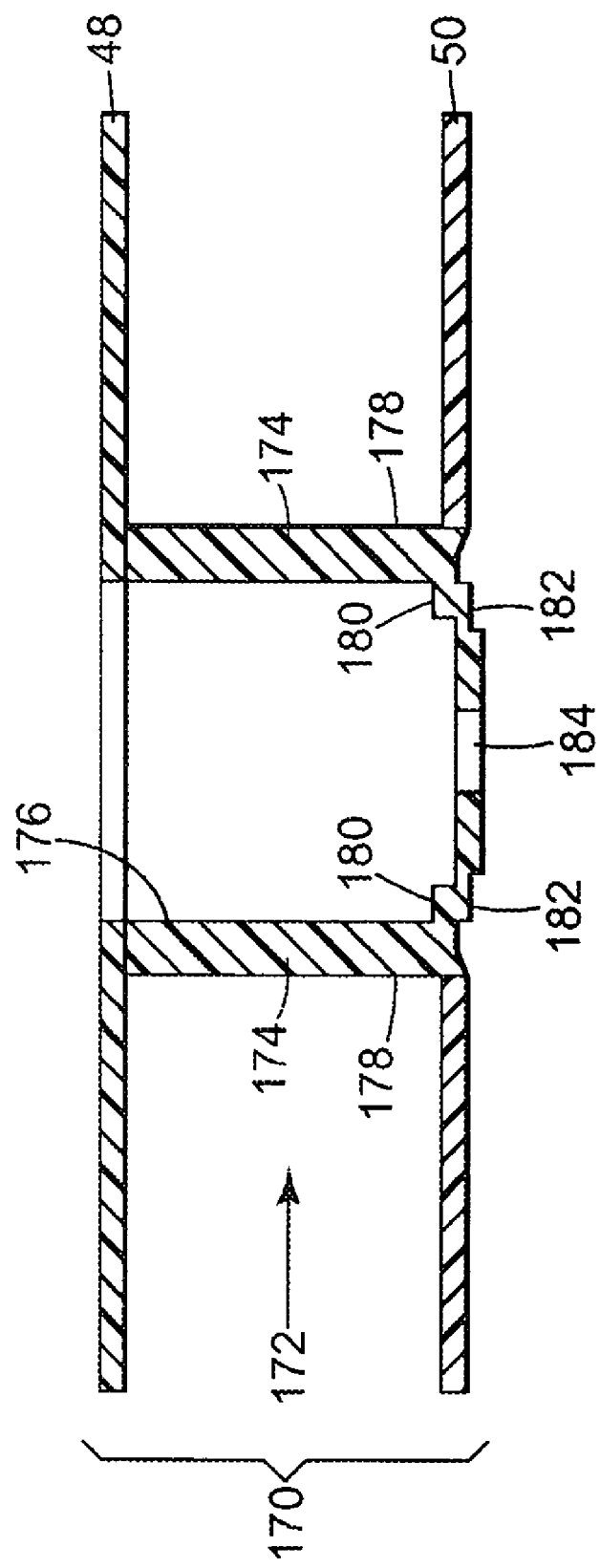
FIG. 8 is a cross-sectional view of a tape reel assembly illustrating a hub comprising a glass-filled polymer according to one embodiment of the present invention.

Another exemplary embodiment of a tape reel assembly 170 having a tape winding surface with an effective radial modulus of greater than 0.3 Msi is illustrated in FIG. 8. The tape reel assembly 170 includes the upper flange 48, the lower flange 50, and a hub 172. The hub 172 includes a core 174 and defines an inner surface 176 and a tape winding surface 178. In the exemplary embodiment illustrated in FIG. 8, the hub 172 is formed from a glass-filled polymer selected such that the tape winding surface 178 exhibits an effective radial modulus of greater than 0.3 Msi. As such, the tape winding surface 178 has an increased resistance to deformation due to a compressive winding force imparted by the winding of storage tape 28 (FIG. 1). In a preferred embodiment, the hub 172 is formed from 30% glass-filled styrene acrylonitrile such that the tape winding surface 178 exhibits an effective radial modulus of approximately 1.0 Msi. In a preferred embodiment, a brake interface 180 and a drive interface 182 defining a drive bore 184 are also formed of 30% glass-filled styrene acrylonitrile, as illustrated in FIG. 8.

FIG. 8 illustrates the hub 172 as a one-piece component. In a related embodiment, a two-piece hub formed of glass-filled polymer is configured to provide a tape winding surface having an effective radial modulus of greater than 0.3 Msi. More particularly, FIGS. 9A and 9B illustrate a tape reel assembly 190 including a first reel section 192 and a second reel section 198. The first reel section 192 includes a first core portion 196, and the upper flange 48. The second reel section 198 includes a second core portion 201, a brake interface 202, a drive interface 204, a drive bore 205, and the lower flange 50. An annular protrusion 206 is provided on the second reel section 198 that mates with a retention groove 208 defined by the first reel section 192. The first and second reel sections 192, 198 snap-fit together via the protrusion 206 and the retention groove 208 in forming the assembled tape reel assembly 190, as illustrated in FIG. 9B. Upon reading and appreciating this disclosure, those skilled in the art will recognize that the first and second reel sections 192, 198 can be mated via snap fitting, threading, plastic welding, or any suitable means for securing the sections 192, 198. Regardless, upon final assembly, the first and second core portions 196, 201 combine to define a hub 210 having an inner surface 200 and a tape winding surface 194. The first and second reel sections 192, 198 are formed from material(s) selected such that upon final assembly, the tape winding surface 194 exhibits an effective radial modulus of at least 0.3 Msi. For example, in one preferred embodiment, the first reel section 192 is an upper reel section and the second reel section 198 is a lower reel section and the upper and lower reel sections 192, 198 are formed of 30% glass-filled styrene acrylonitrile and provide the tape winding surface 194 with an effective radial modulus of approximately 0.5 Msi.

Figure 10:
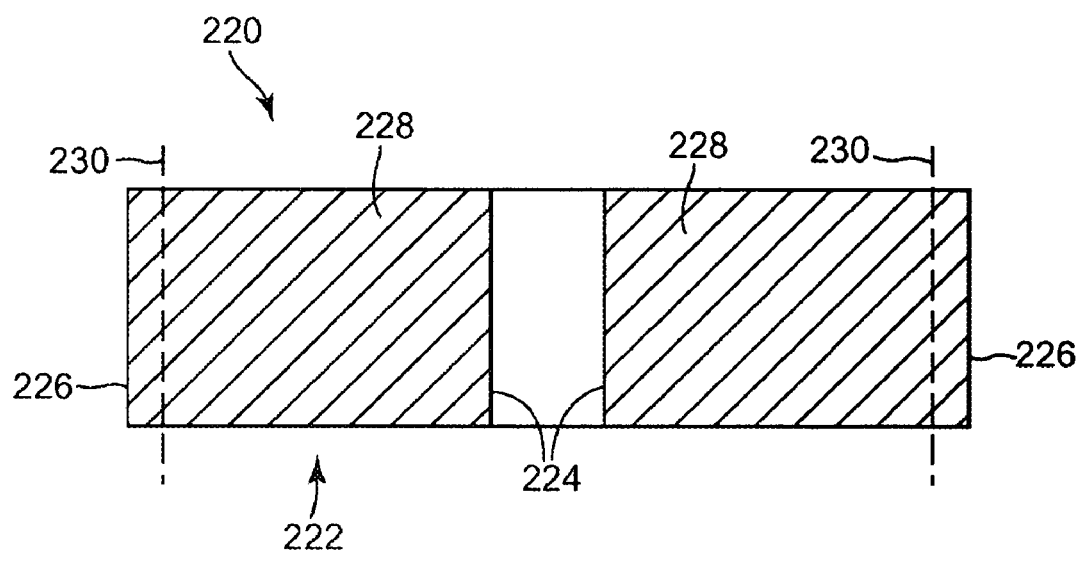
FIG. 10 is a cross-sectional view of a tape reel assembly illustrating an alternate hub in accordance with the present invention.

An alternate tape reel assembly 220 in accordance with the present invention is illustrated in the cross-sectional view of FIG. 10. The tape reel assembly 220 includes a hub 222 that defines an inner surface 224 and a tape winding surface 226, and a core 228 disposed between the inner surface 224 and the tape winding surface 226. In accordance with the present invention, the tape winding surface 226 has an effective radial modulus of greater than 0.3 Msi. The increased stiffness at the tape winding surface 226 can be achieved via any of the above-described embodiments having the higher effective radial modulus. For example, a metal insert (not shown) could form at least a portion of the tape winding surface 226. Alternately, the hub 222 could be formed of 30% glass-filled polymer. Moreover, a metal insert can form at least a portion of the inner surface 224. In yet another example of increasing the stiffness of the tape winding surface 226, the core 228 can be comprised of plastic and a metal insert disposed within the core, preferably within the core 228 and along an axis 230 adjacent to the tape winding surface 226.

Figure 11:
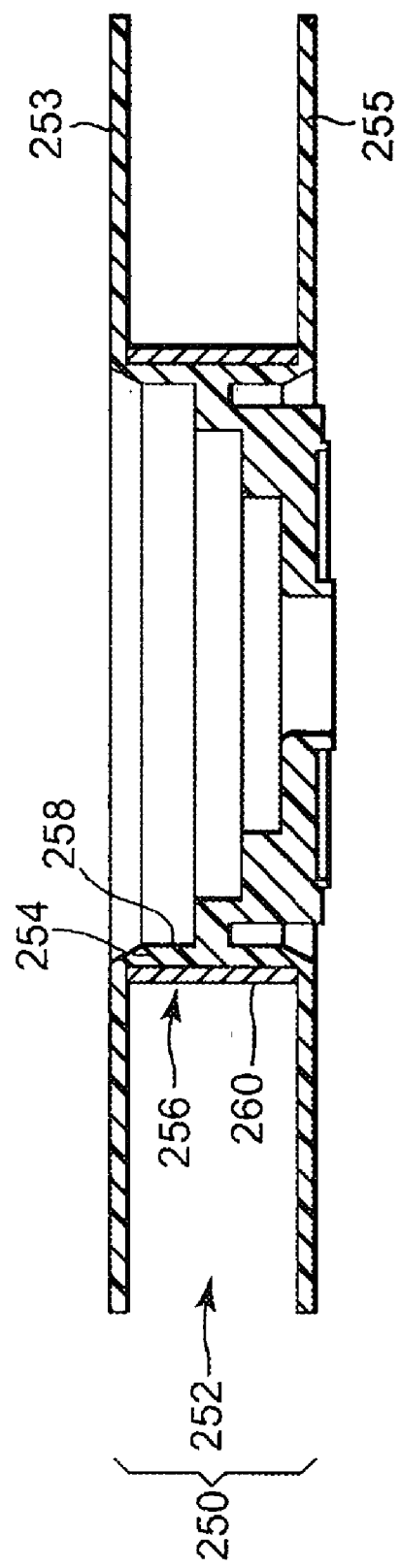
FIG. 11 is a cross-sectional view of a tape drive spool for a tape drive system illustrating a hub in accordance with the present invention.

An alternate embodiment of a tape reel assembly 250 employed as a tape drive spool is illustrated in FIG. 11. As is known in the art, a tape drive spool (or take-up reel) forms part of a tape drive (not shown) and otherwise receives, winds and unwinds storage tape from a data storage tape cartridge inserted into the tape drive. The tape reel assembly 250 includes a hub 252, an upper flange 253, and a lower flange 255. The hub 252 includes a core 254 and a metal insert 256 that combine to define an inner surface 258 and a tape winding surface 260. The flanges 253, 255 extend in a radial fashion from opposing sides of the hub 252. In one embodiment, the core 252 and the flanges 253, 255 are integral, unitary molded assembly. Alternatively, one or both of the flanges 253 and/or 255 can be formed apart from the core 254. Regardless, the core 254, and in a preferred embodiment the flanges 253, 255, are insert molded to the metal insert 256. With this in mind, the metal insert 256 is an annulus of metal, preferably aluminum with a width (or height) approximately equal to the width of storage tape (not shown) that is to be wrapped about the hub 252, and forms at least part of, preferably an entirety of, the tape winding surface 262. In one embodiment, the metal insert 256 has a thickness between 0.005 and 0.250 inch, more preferably between 0.010 and 0.100 inch, even more preferably between 0.025 and 0.075 inch, and most preferably 0.050 inch. Regardless, and as described above, the tape winding surface 260 has an effective radial modulus of greater than 0.3 Msi.

Figure 12:
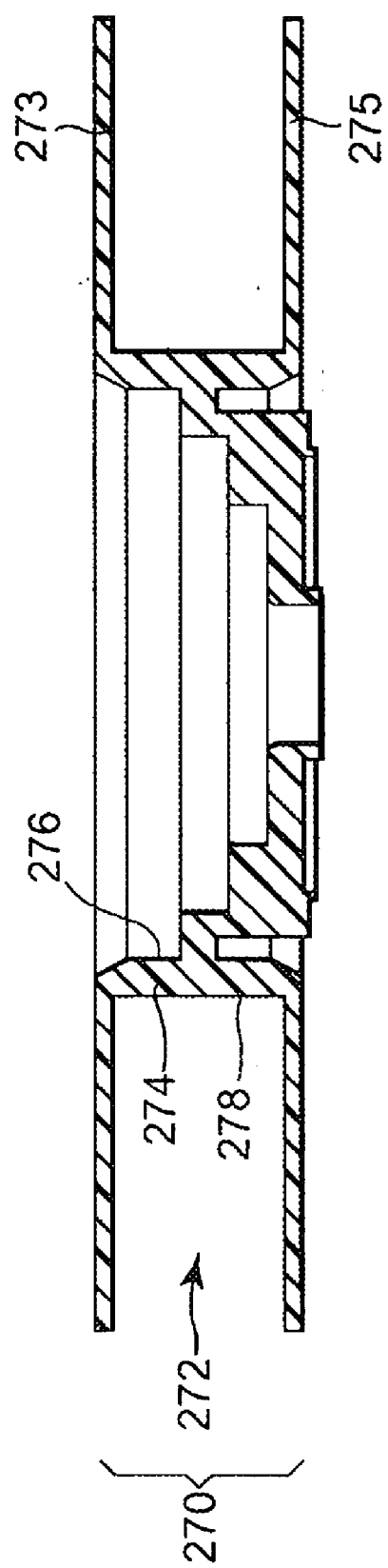
FIG. 12 is a cross-sectional view of another tape drive spool for a tape drive system illustrating a hub in accordance with the present invention.

Another alternate embodiment of tape reel assembly 270 employed as a tape drive spool is illustrated in FIG. 12. The tape reel assembly 270 is an integral, unitary molded structure and includes a hub 272, an upper flange 273, and a lower flange 275. The hub 272 includes a core 274 and defines an inner surface 276 and a tape winding surface 278. In the exemplary embodiment illustrated in FIG. 12, the tape reel assembly 270, including the hub 272 and the flanges 273, 275, is formed from a glass-filled polymer selected such that the tape winding surface 278 exhibits an effective radial modulus of greater than 0.3 Msi. As such, the tape winding surface 278 has an increased resistance to deformation due to a compressive winding force imparted by the winding of storage tape (not shown).

The tape reel assemblies 250, 270 described above are two-piece (FIG. 11) or one-piece (FIG. 12) assemblies injected molded from plastic. The tape winding surfaces 260, 278, respectively, are configured to exhibit an effective radial modulus of greater than 0.3 Msi. Prior art tape drive spools are three-piece assembles manufactured from metal. To this end, interior features of a tape drive spool must satisfy strict tolerance requirements; with prior art metal tape drive spools, then, the costs associated with precisely machining these features are quite high. Consequently, the prior art tape drive spools require assembly of the flanges to the hub and are expensive to manufacture. In contrast, the inventive tape reel assemblies 250, 270, otherwise useful as tape drive spools, are less expensive to manufacture and require no assembly. That is to say, the tape reel assembly 250 of FIG. 11 requires only that the metal insert 256 be precisely machined with this precision being independent of any other tape reel features; the hub core 254 and flanges 253, 255 are insert molded about the metal insert 256 and thus can provide the requisite interior features with minimal costs/time. Further, the one-piece, integrally molded tape reel assembly 270 of FIG. 12 eliminates the need for a separate metal component, thus further reducing costs and manufacturing time as compared to conventional metal tape drive spool designs.

Although specific embodiments have been illustrated and described herein for purposes of description of the preferred embodiments, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof. For example, while the tape reel assembly of the present invention has been described as being part of a data storage tape cartridge, other tape drive system applications are equally applicable. Thus, the tape reel assembly of the present invention can be provided as part of a tape drive and otherwise used to wind and unwind storage tape within the tape drive.

What is claimed is:

1. A tape reel assembly for use in a tape drive system for winding and unwinding a storage tape, the tape reel assembly comprising:
   a hub including a core defining an inner surface and a tape winding surface, the inner surface extending between opposing sides of the hub parallel to the tape winding surface, at least a portion of the hub being made of plastic;
   wherein at least a portion of the inner surface includes a metal insert.

2. The tape reel assembly of claim 1, wherein the metal insert includes an annular ring of steel.

3. The tape reel assembly of claim 1, wherein the metal insert is a cup shaped annulus that defines a drive washer and a drive bore.

4. The tape reel assembly of claim 1, wherein the tape reel assembly further includes:
   an upper flange and a lower flange, the upper and lower flanges extending in a radial fashion from opposing sides of die hub, respectively.

5. The tape reel assembly of claim 1, wherein the inner surface defines a length extending between opposing sides of the hub that is substantially equal to a length of the tape winding surface extending between opposing sides of the hub.

6. A tape reel assembly for use in a tape drive system for winding and unwinding a storage tape, the tape reel assembly comprising:
   an annular hub including:
      a core that defines a tape winding surface,
      a metal backbone that defines a major inner surface opposite
      the tape winding surface, the metal backbone extending an entire distance between opposing sides of the hub;
   wherein at least a portion of the hub comprises plastic.

7. The tape reel assembly of claim 6, wherein the tape winding surface has an effective radial modulus of greater than 0.3 million pounds-per-square-inch.

8. The tape reel assembly of claim 6, wherein the tape winding surface has an effective radial modulus of approximately 1.0 million pounds-per-square-inch.

9. The tape reel assembly of claim 6, wherein the backbone defines a drive bore separated from the inner surface by a distance of approximately 0.5 inch.

10. The tape reel assembly of claim 6, wherein the backbone is a cup shaped annulus comprised of steel.

11. The tape reel assembly of claim 6, wherein the tape reel assembly further includes:
    an upper flange and a lower flange, the upper and lower flanges extending in a radial fashion from opposing sides of the hub, respectively.

12. A data storage tape cartridge comprising:
    a housing defining an enclosed region;
    at least one tape reel assembly rotatably disposed within the enclosed region and including:
    a hub including a cup shaped annular backbone that defines an annular inner surface substantially parallel to a tape winding surface; and
    a storage tape wound about the tape winding surface of the hub;
    wherein winding of the storage tape onto the hub applies a stress that deflects the tape winding surface, and further wherein the cup shaped annular backbone configures the tape winding surface to have an effective radial modulus of greater than 0.3 million pounds-per-square-inch.

13. A tape reel assembly for use in a tape drive system for winding and unwinding a storage tape, the tape reel assembly comprising:

a hub defining an inner surface opposite a tape winding surface, the inner surface comprising a metal backbone that defines a cup shaped annular insert including an annular wall substantially parallel to the tape winding surface, and at least a portion of the hub being made of plastic;

wherein the metal backbone configures the tape winding surface to have an effective radial modulus of greater than 0.3 million pounds-per-square-inch, the effective radial modulus defined as a ratio of radial stress applied to the tape winding surface by wound storage tape divided by a resulting radial deformation at the tape winding surface due to the applied radial stress.

14. The tape reel assembly of claim 13, wherein the metal backbone defines a drive washer and a drive bore.

15. The tape reel assembly of claim 13, wherein the hub includes a plastic core defining the tape winding surface.

16. A tape reel assembly for use in a tape drive system for winding and unwinding a storage tape, the tape reel assembly comprising:

a hub including:
  a metal cup shaped annular backbone defining an annular inner surface wall; and
  a plastic core coupled to the backbone and defining a tape winding surface;
wherein the tape winding surface is disposed opposite of the inner surface.

17. The tape reel assembly of claim 16, wherein the metal cur shaped annular backbone defines a drive washer and a drive bore.

18. The tape reel assembly of claim 17, wherein the drive washer and the drive bore are located in a plane exterior to the plastic core.

19. The tape reel assembly of claim 16, wherein the metal cup shaped annular backbone is an insert integrally formed with the plastic core.

* * * * *